United States Patent [19]

Wang et al.

[11] Patent Number: 4,902,765
[45] Date of Patent: Feb. 20, 1990

[54] ALLYL THIOUREA POLYMERS

[75] Inventors: Samuel S. Wang, New Haven; D. R. Nagaraj, Stamford, both of Conn.

[73] Assignee: American Cyanamid Company, Stamford, Conn.

[21] Appl. No.: 221,389

[22] Filed: Jul. 19, 1988

[51] Int. Cl.$^4$ .............................................. C08F 28/00
[52] U.S. Cl. .................................... 526/288; 524/421
[58] Field of Search ......................................... 526/288

[56] References Cited

U.S. PATENT DOCUMENTS 2,858,295 10/1958 Melamed ............................ 526/288

Primary Examiner—Christopher Henderson
Attorney, Agent, or Firm—Frank M. Van Riet

[57] ABSTRACT

Various acrylic acid allyl/thiourea polymers and their use as depressants in the beneficiation of sulfide minerals from ores are disclosed.

3 Claims, No Drawings

ALLYL THIOUREA POLYMERS

BACKGROUND OF THE INVENTION

The present invention relates to froth flotation processes for recovery of mineral values from base metal sulfide ores. More particularly, it relates to new and improved sulfide mineral depressants for use in separating or beneficiating sulfide minerals by froth flotation procedures, and to a new and improved process for beneficiating sulfide minerals by froth flotation incorporating said depressants.

Certain theory and practice state that the success of the sulfide flotation process depends to a great degree on reagents called collectors that impart selective hydrophobicity to the mineral value of an ore which has to be separated from other minerals contained therein.

Certain other important reagents, such as the modifiers, are also largely responsible for the success of flotation separation of the sulfide and other minerals. Modifiers include all reagents whose principle function is neither collection nor frothing, but one of modifying the surface of the mineral so that a collector either adsorbs to it or does not. Modifying agents may thus be considered as depressants, activators, pH regulators, dispersants, deactivators, etc. Often, a modifier may perform several functions simultaneously. Current theory and practice of sulfide flotation further state that the effectiveness of all classes of flotation agents depends to a large extent on the degree of alkalinity or acidity of the ore pulp. As a result, modifiers that regulate the pH are of great importance. The most commonly used pH regulators are lime, soda ash and, to a lesser extent, caustic soda. In sulfide flotation, however, lime is by far the most extensively used. In copper sulfide flotation, which dominates the sulfide flotation industry lime is used to maintain pH values over 10.5. The costs associated with adding lime are becoming quite high and plant operators are exploring flotation processes which require little or no lime addition, e.g., flotation processes which are effectively conducted at slightly alkaline, neutral or even at acid pH values. Neutral and acid circuit flotation processes are particularly desired because pulp slurries may be easily acidified by the addition of sulfuric acid and sulfuric acid is obtained in many plants as a by-product of the smelters. Therefore, flotation processes which require preadjustment of pH to neutral or acid pH values using less expensive sulfuric acid are preferable to current flotation processes, which presently require pH readjustment to highly alkaline values of at least about 11.0 using lime which is more costly.

As has been mentioned above, lime consumption in individual plants may vary anywhere from about one pound of lime per metric ton of ore processed up to as high as 20 pounds of lime per metric ton of ore. In certain geographical locations, such as South America, lime is a scarce commodity, and the current costs of transporting and/or importing lime has risen considerably in recent years. Still another problem with prior art high alkaline processes is that the addition of large quantities of lime to achieve sufficiently high pH causes scale formation on plant and flotation equipment, thereby necessitating frequent and costly plant shutdowns for cleaning.

It is apparent, therefore, that there is a strong desire to reduce or eliminate the need for adding lime to sulfide flotation processes. In addition, reducing or eliminating lime in sulfide ore processes will provide other advantages by facilitating the operation and practice of unit operations other than flotation, such as fluids handling or solids handling, as well as the improved recovery of secondary minerals.

In general, xanthates and dithiophosphates are employed as sulfide collectors in the froth flotation of base metal sulfide ores. A major problem with these sulfide collectors is that at pH's below 11.0, poor rejection of pyrite or pyrrhotite is obtained. More particularly, in accordance with present sulfide flotation theory, the increased flotation of pyrite at a pH of less than 11 is attributed to the ease of oxidation of thio collectors to form corresponding dithiolates, which are believed to be responsible for pyrite flotation.

In addition to attempts at making the sulfide collectors more selective for value sulfide minerals, other approaches to the problem of improving the flotation separation of value sulfides have included the use of modifiers, more particularly depressants, to depress the non-value sulfide minerals and gangue minerals so that they do not float in the presence of collectors, thereby reducing the levels of non-value sulfide contaminants reporting to the concentrates. As has been mentioned above, a depressant is a modifier reagent which selectively prevents or inhibits adsorption of the collector on certain of the mineral particle surfaces present in the flotation slurry or pulp. Prior art sulfide depressants have generally comprised highly toxic and difficult to handle inorganic compounds such as sodium cyanide, (NaCN), sodium hydro sulfide, (NaSH), and Nokes reagent ($P_2S_5$ and NaOH). These conventional sulfide depressants represent a number of serious problems and have serious shortcomings attendant their use. The oft used depressants are frequently extremely toxic and may be associated with a terrible stench. They cannot be used safely over a wide range of pH values, but instead must be used at high pH values, so that lime consumption problems are not solved by their use. Moreover, the conventional inorganic depressants are often either nonselective or when used in sufficient quantities to provide good separation, provide economically unsatisfactory concentrates, i.e., the yield of value minerals is too low.

The problem facing flotation beneficiation methods today is to provide value mineral concentrations which contain substantially reduced levels of gangue sulfide minerals. The flotation concentrates are generally delivered to the smelting operations without any further substantial processing. Large amounts of sulfur dioxide are emitted from the smelters during the smelting of sulfide concentrates; a significant amount of $SO_2$ is from the gangue sulfide minerals such as iron sulfides, which invariably report to the smelters as contaminants in the flotation concentrates. Sulfur dioxide pollution of the atmosphere has always been a serious problem because it is a major cause of acid rain, which has a devastating effect on the ecology. Despite significant advances in smelting technology, $SO_2$ pollution remains extremely serious.

Complex sulfide ores are an important source of many base metals and precious metals. It is quite common to find 3–5 metals in each deposit, in addition to Au, Ag and impurity elements such as Sb, As, Bi and Hg. The ore treatment method depends on the relative proportions of the different metals therein, but the more widely used routes are: (a) bulk flotation of sulfides followed by separation of value sulfides, and (b) differential flotation of sulfides. It is necessary to characterize each complex sulfide deposit quantitatively and systematically and then to select the economically optimum combination of process steps to suit the characteristics. Depressants are invariably used in all stages of flotation. Lime, sodium or zinc cyanide, zinc sulfate (often in combination with sodium cyanide), SO₂, dichromate, dextrine, hypochlorite, and ferro cyanide are some of the most commonly used depressants.

The beneficiation criteria for treating the complex sulfide ores are maximum value metal and precious metals (if any) recovery and minimum contamination of the value sulfide concentrate by non-value sulfide minerals. In many cases, these criteria cannot be met without seriously sacrificing value metals production or recovery. Therefore, there remains an urgent need for flotation reagents that can selectively depress gangue sulfide minerals reporting to the concentrate and concurrently provide economically acceptable recoveries of value sulfide minerals.

Unexpectedly, in view of the foregoing, it has now been discovered that certain synthetic polymers which contain certain functional groups are very effective depressants for all sulfide numerals in general, and, more particularly, for pyrite, pyrrhotite, and other gangue sulfide minerals. The use of the depressants of the present invention provides a substantial reduction in gangue sulfide minerals contamination in the sulfide minerals concentrates reporting to the smelters, thereby reducing the adverse environmental impact of SO₂ emissions caused by smelting operations in the industry. It has also been discovered that the instant polymers unexpectedly depress one or more value sulfide minerals in the presence of other value sulfides or non-sulfides under appropriate dosage and/or other operating conditions.

BACKGROUND OF THE INVENTION

The copolymerization of allyl thioureas with an acrylic acid has not been disclosed in the prior art. Allyl thioureas have, however, been copolymerized with other materials such as sulfur dioxide (U.S. Pat. No. 3,386,972) and vinyl chloride (U.S. Pat. No. 3,012,010). These copolymerizations are not suggestive, however, of the copolymers of the present invention.

Additionally, U.S. Pat. Nos. 2,832,755755; 2,837,499and 2,858,295 disclose the copolymerization of vinyl thioureas with unsaturated comonomers while U.S. Pat. No. 3,671,492 teaches the copolymerization of thioureas such as N-vinylethylene thiourea with unsaturated monomers. None of these references, however, teach the production of polymers falling within the structure set forth hereinbelow and all of the above-cited references fail to teach the use of allyl thiourea copolymers as a depressant in the recovery of mineral values from ores.

A recent pending application, Ser. No. 182,681, filed Apr. 18, 1988 now U.S. Pat. No. 4,866,150, discloses and claims copolymers of acrylamide and allyl thiourea and their use in the recovery of mineral values form ores, however, no acrylic acid based copolymers void of an acrylamide, are disclosed therein.

DESCRIPTION OF THE INVENTION

In accordance with the present invention, new and improved sulfide mineral depressants are provided in the form of polymeric compositions, said compositions comprising a polymer comprising:

(i) x units of the formula:

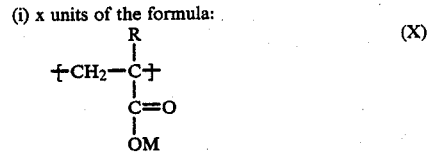

(ii) y units of the formula:

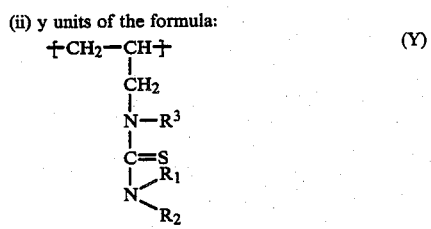

(iii) z units of the formula:

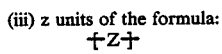

wherein R is hydrogen or $C_1$–$C_4$ alkyl; each $R^1$ and $R^2$, individually, is hydrogen a $C_1$–$C_4$ alkyl group or an aryl group, each $R^3$, is hydrogen, a $C_1$–$C^4$ alkyl group or an aryl group, M is hydrogen, an alkali metal, ammonium or $C_1$–$C_4$ alkyl ammonium, Z represents the polymerization residue of any monomer except an acrylamide copolymerizable with units X and Y, x represents a residual mole percent fraction, preferably 10–90%, y is a mole percent fraction ranging from about 1.0% to about 49%, preferably 5–30%, z is a mole percent fraction ranging from about 0% to about 49%; preferably 0–30%, and the molecular weight of the polymer ranges from about 1,000 to about 1,000,000.

In preferred embodiments, the polymeric compositions comprise polymers within the scope of the above definition which comprise as the Y units, monomeric units wherein $R^1$, $R^2$ and $R^3$ are all hydrogen.

The new and improved compositions of the present invention may be prepared by known polymerization methods whereby the acrylic acid component X is copolymerized with the thiourea component Y and, optionally, with comonomer unit Z. Examples of suitable polymerization procedures are set forth in U.S. Pat. Nos. 3,002,960 and 3,255,142, hereby incorporated herein by reference. More particularly, the monomers may be copolymerized at 30°–100° C., preferably 45°–65° C., with peroxide, VAZO® type and redox catalysts using, as the reaction arena, water, $C_1$–$C_4$ alcohols, DMF, DMSO, N-methyl pyrolidone, dioxane, etc.

More particularly, the polymers of this invention comprise as the (X) units, those derived from acrylic acid per se, methacrylic acid or alkali metal, ammonium or $C_1$–$C_4$ alkyl ammonium, e.g., mono, di, tri and tetramethyl ammonium salts of acrylic acid and methacrylic acid, ethacrylic acid etc..

The (Z) units of the polymers defined above exclude acrylamide monomers such as acrylamide per se, alkyl acrylamides and N-substituted acrylamides and generally comprise monomers such as acrylonitrile, styrene, cationics such as diallyl dimethyl ammonium chloride, methacrylamidopropyl trimethylammonium chloride, acrylamidopropyl trimethylammonium chloride, dimethylaminopropyl methacrylamide, dimethylaminoethyl acrylate or methacrylate and their quaternary salts, 2-acrylamido-2-methylpropanesulfonic acid, vinyl sulfonic acid, acrylic, methacrylic or maleic acids, their alkali metal e.g., sodium or potassium, or ammonium salts, and alkyl esters thereof and the like.

The (Y) units of the polymers defined above are derived from thiourea derivatives such as allyl thiourea, N-allyl-N'-methyl thiourea, N-allyl-N'-benzoyl thiourea, N-allyl-N-methyl-N',N'-dimethyl thiourea and the like. These novel polymers may be used in flotation processes for important separations; for example, copper sulfides from molybdenite by depressing the former; lead and copper sulfides from pyrite and sphalerite by depressing the latter; pentlandite from pyrrhotite by depressing the latter; copper sulfides or sphalerite from pyrite by depressing the latter; etc. at dosages ranging from about 0.001 kg/ton to 1.0 kg/ton on an active solids basis.

In another aspect, the present invention provides a new and improved method for the beneficiation of value sulfide minerals from sulfide ores with selective rejection of gangue sulfide minerals, said method comprising:
(a) providing an aqueous pulp slurry of finely divided, liberation-sized ore particles:
(b) conditioning said pulp slurry with an effective amount of a synthetic depressant, a sulfide mineral collector and a frothing agent, said synthetic depressant comprising a polymer comprising:

(i) x units of the formula: (X)

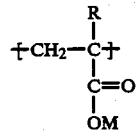

(ii) y units of the formula: (Y)

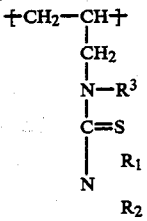

(iii) z units of the formula:

wherein R is hydrogen or $C_1$–$C_4$ alkyl, each $R^1$ and $R^2$ is, individually, hydrogen, $C_1$–$C_4$ alkyl or an aryl group, $R^3$ is hydrogen, a $C_1$–$C_4$ alkyl group or an aryl group, M is hydrogen, an alkali metal, ammonium or $C_1$–$C_4$ alkyl ammonium, Z represents the polymerization residue of any monomer, except an acrylamide, copolymerizable with units X and Y, x represents a residual mole percent fraction, preferably 1–90%; y is a mole percent fraction ranging from 1.0 to about 49%; preferably 5–30%; z is a mole percent fraction ranging from about 0% to about 49%; preferably 0–30% and the molecular weight of said polymer ranges from about 1000 to about 1,000,000; and,
(c) collecting the value sulfide mineral by froth flotation procedures.

The new and improved method for beneficiating value sulfide minerals by froth flotation procedures employing the synthetic depressants in accordance with this invention provides excellent metallurgical recovery with significant improvements in grade. The novel sulfide mineral depressants are effective over a wide range of pH and dosages. The depressants are compatible with available frothers and sulfide mineral collectors and may be readily incorporated into any currently operating system or facility. Moreover, use of the polymeric sulfide mineral depressants can significantly reduce $SO_2$ emissions from smelting operations by reducing the amount of gangue sulfide minerals which remain in the value sulfide concentrate to be smelted.

The present invention is directed to the selective separation of sulfides, for example, gangue sulfides, from copper ores, copper-molybdenum ores, complex sulfide ores, etc. containing lead, copper, zinc, silver, gold, etc., nickel and nickel-cobalt ores, gold ores and gold-silver ores and to facilitate copperlead, lead-zinc, copper-zinc separations, etc.

The following examples are set forth for purposes of illustration only and are not to be construed as limitations on the present invention, except as set forth in the appended claims. All parts and percentages are by weight unless otherwise specified.

EXAMPLE 1

To a suitable 4-neck vessel equipped with a mechanically driver stirrer and a condenser, are added 41.0 parts of 36.6% allyl thiourea in 1:1 isopropanol and water, and 150 parts of water. The pH is adjusted to about 5.0 with 50% sulfuric acid. The vessel is heated to 55° C., and 22 parts of ammonium persulfate (20%), 21 parts of sodium metabisulfite (17%), and 164 parts of acrylic acid, neutralized (pH 7.0) with concentrated ammonium hydroxide, are metered in separately. The monomer feeding time is 90–100 minutes and redox catalyst feeding time is 180–200 minutes. The polymerization is continued three additional hours after the addition of the redox catalyst. The finished product has a bulk viscosity of 300 cps and an intrinsic viscosity of 0.36.

EXAMPLE 2

The procedure of Example 1 is again followed except that 2,2'-azobis(2,4-dimethylvaleronitrile) (ABDV) catalyst is used. A copolymer is obtained. Analysis of this copolymer shows that the copolymer contains about 7.6 mole percent allyl thiourea.

EXAMPLE 3-9

The procedures of Examples 1 and 2 are again followed, i.e., either ammonium persulfate (APS) or ABDV is used to initiate the polymerizations. The compositions prepared are shown in Table I, below. Mercaptoethanol is used as a chain transfer agent.

TABLE I

| | (Weight %) | | | | | |
| | X units | | Y units | | | Z units | |
| Example | R; | M | $R_1$; | $R^2$ | $R^3$ | | Catalyst |
| --- | --- | --- | --- | --- | --- | --- | --- |
| 3 | H | H(80) | H | $CH_3$ | H(20) | — | ABDV |
| 4 | H | Na(70) | H | $(CH_2)_2OH$ | H(15) | DADMAC[2](15) | ABDV |
| 5 | $CH_3$ | Na(80) | H | 2-OH ethyl | H(15) | NAPTAC[3](5) | ABDV |

TABLE I-continued

| | (Weight %) | | | | | | |
|---|---|---|---|---|---|---|---|
| | X units | | Y units | | Z units | | |
| Example | R; | M | $R_1$; | $R^2$ | $R^3$ | | Catalyst |
| 6 | $CH_3$ | H (90) | H | n-butyl | H(2) | $DMAEMMC^5(8)$ | ABDV |
| 7 | H | $NH_3(75)$ | H | n-phenyl | H(5) | $APTAC^4(20)$ | ABDV |
| 8 | H | K(45) | H | H | $CH_3(45)$ | $EA^1$ | APS |
| 9 | H | H(50) | $CH_3$ | $CH_3$ | H(10) | $MAPTAC^3 (40)$ | APS |
| 10 | H | H(80) | H | H | H(10) | $AMMPS^6 (10)$ | ABDV |

[1] Ethyl acrylate (EA)
[2] Diallyldimethyl ammonium chloride (DADMAC)
[3] Methacrylamidopropyltrimethyl ammonium chloride (MAPTAC)
[4] Acrylamidopropyltrimethylammonium chloride (APTAC)
[5] Dimethylaminoethylmethacrylate/methyl chloride quaternary. (DMAEMMC)
[6] 2-Acrylamido-2-methylpropane sulfonic acid

EXAMPLE 11

The copolymer of Example 1 is evaluated with a South American copper concentrate which contains 0.8% Mo. The standard depressant is sodium hydrosulfide. The results are as follows:

| Depressant | Dosage Kg/Ton | Copper Recovery, % | Mo Recovery, % | Mo Grade, % |
|---|---|---|---|---|
| NaSH (100%) | 2.4 | 5.13 | 95.18 | 9.4 |
| Copolymer of Example 1 (28.3% Active) plus | 0.19 | 3.23 | 96.14 | 13.20 |
| NaSH (100%) | 0.52 | | | |

The copolymer of Example 1 gives equal or better Mo recovery and Mo grade but lower copper recovery showing its efficacy as a copper depressant. The overall NaSH consumption is reduced from 2.4 Kg/Ton to 0.52 Kg/Ton and the actual copolymer usage is merely 0.19×0.283 =0.054 Kg/Ton!

EXAMPLES 12-20

Following the procedure of Example 11, the polymers of Examples 2-10 are used to depress Cu and float Mo. In each L instance the results are similar to those achieved in Example 11. Use of the polymers of Examples 1-11, in the absence of the surface modifying agent, i.e, NaSH, also results in a satisfactory separation of Cu and Mo.

It must also be noted that the dosages of the novel polymer and NaSH in Example 11 are not optimized. Those skilled in the art will be able to readily obtain the bes performance at very low dosages of the novel polymer by simply optimizing the dosages of the polymer, alone, or with NaSH. Although it is not our objective to be bound by any one mechanism for the efficacy of the combination of the novel polymer and NaSH in Cu-Mo separation, one could speculate that the role of the small amount of NaSH used in Example 11 is one of activating/cleaning the Cu sulfide mineral surfaces, so that the novel polymer can adsorb on these selectively rather than on $MoS_2$ surfaces. Stated differently, the novel polymer adsorbs effectively and selectively on Cu sulfides under appropriate redox potentials. NaSH, being a strong reducing and potential determining agent for sulfides, is providing such appropriate redox conditions at controlled dosages. One can also speculate that if the conditions are too reducing (i.e., very high dosages of NaSH), the adsorption of the novel polymer would be destabilized in a manner similar to the destabilization of the xanthate collectors. Under these conditions, as also in the absence of NaSH, the polymer would be adsorbed non-selectively on $MoS_2$ surfaces, though this adsorption is weak and physical in nature.

It must be noted that any other chemical with strongly reducing or oxidizing (in certain minerals systems) properties can be used in conjunction with the novel polymer to obtain appropriate redox conditions. In other words, any "surface-modifying" agent can be used to prepare the sulfide surfaces to enhance adsorption of the novel polymers. Examples of such reagents include NaCN, Nokes reagent, mercaptoethanol, thioglycolic acid, Na or K ferri and ferro cyanides, hydroxyethyltrithiocarbonates, and other trithiocarbonates, hydrogen peroxide, ozone, air, oxygen, sulfur dioxide, zinc cyanide, arsenic Nokes, mercaptopropionic acid, mercaptosuccinic acid, other related mercapto acids, 2-thiouracil, thioglycerol and the like. Additional compounds that can be used in conjunction with the novel polymer are given in the publication Nagaraj et al., Trans. IMM, Vol. 95, Mar. 1986, pp. C17. Ratios of these surface modifying agents to the novel polymer hereof range from about 0.05-5.0:1, respectively, preferably about 0.02-2.0:1, although conditions of use and ores treated may vary these amounts somewhat.

A further point to note is that a conditioning time of 20 min. is usually required for standard depressants, whereas with the novel polymer hereof, conditioning times of less than 10 minutes are often quite adequate. This time differential has a significant practical implication in terms of higher throughput and operational cost savings.

We claim:

1. A polymer composition comprising recurring units of the formula:

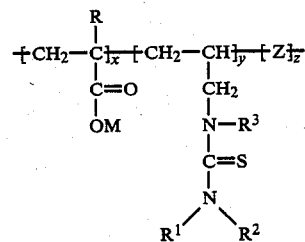

wherein R is hydrogen or a $C_1$-$C_4$ alkyl group, $R^1$ and $R^2$ are, individually hydrogen, a $C_1$-$C_4$ alkyl group or an aryl group, $R^3$ is hydrogen, a $C_1$14 $C_4$ alkyl group or an aryl group, M is hydrogen, an alkali metal, ammonium or $C_1$-$C_4$ alkyl ammonium, Z represents the polymerization residue of any copolymerizable monomer except an acrylamide, x represents a residual mole percent fraction, y represents a mole percent fraction ranging from about 1.0 to about 49.0%, by weight, based on the total weight of x, y and z, z represents a mole percent fraction ranging from about 0% to about 49.0%, same basis, and the molecular weight of the polymer is between about 1000 and about 1,000,000.

2. A polymer composition according to claim 1 wherein each of R, $R^1$, $R^2$, and $R^3$, is hydrogen.

3. A polymer composition according to claim 1 wherein at least one of R, $R^1$, $R^2$, and $R^3$, is $C_1$–$C_4$ alkyl.

* * * * *

UNITED STATES PATENT OFFICE
CERTIFICATE OF CORRECTION

Patent No. 4,902,765  Dated Feb. 20, 1990

Inventor(s) Samuel Shan-Ning Wang and D.R. Nagaraj

It is certified that error appears in the above-identified patent and that said Letters Patent is hereby corrected as shown below:

In Claim 1, line 1, delete "comprising" and substitute therefor, --consisting essentially of--.

Signed and Sealed this

Sixth Day of August, 1991

Attest:

HARRY F. MANBECK, JR.

Attesting Officer

Commissioner of Patents and Trademarks